(12) United States Patent
Li (10) Patent No.: US 12,010,109 B2
(45) Date of Patent: Jun. 11, 2024

(54) METHODS AND APPARATUS FOR SECURE ACCESS TO ONLINE EVENTS

(71) Applicant: Zoom Video Communications, Inc., San Jose, CA (US)

(72) Inventor: Wei Li, Cupertino, CA (US)

(73) Assignee: Zoom Video Communications, Inc., San Jose, CA (US)

( * ) Notice: Subject to any disclaimer, the term of this patent is extended or adjusted under 35 U.S.C. 154(b) by 24 days.

(21) Appl. No.: 17/068,778

(22) Filed: Oct. 12, 2020

(65) Prior Publication Data

US 2022/0116378 A1    Apr. 14, 2022

(51) Int. Cl.
| | |
|---|---|
| *H04L 9/06* | (2006.01) |
| *G06F 21/10* | (2013.01) |
| *H04L 9/40* | (2022.01) |
| *H04L 29/06* | (2006.01) |

(52) U.S. Cl.
CPC ............ *H04L 63/083* (2013.01); *G06F 21/10* (2013.01); *H04L 9/0643* (2013.01)

(58) Field of Classification Search
CPC ..... G06Q 10/02; H04L 63/083; H04L 9/0643; G06F 21/10
USPC .......................................................... 726/7
See application file for complete search history.

(56) References Cited

U.S. PATENT DOCUMENTS

| | | | | |
|---|---|---|---|---|
| 8,784,195 B1 * | 7/2014 | Crowder, Jr. | ......... | H04L 9/3247 463/19 |
| 9,037,513 B2 * | 5/2015 | Rosenblatt | ............ | G06Q 30/00 705/22 |
| 11,816,708 B2 * | 11/2023 | Anderson | ............... | H04L 67/02 |
| 2008/0034073 A1 * | 2/2008 | McCloy | .............. | H04L 63/0236 709/223 |
| 2010/0082491 A1 | 4/2010 | Rosenblatt et al. | | |
| 2012/0253983 A1 * | 10/2012 | Lewin | .................... | G06Q 10/02 705/27.1 |

(Continued)

FOREIGN PATENT DOCUMENTS

WO      2006012216      2/2006

OTHER PUBLICATIONS

A Secure and Flexible Electronic-Ticket System, Khan et al., Jul. 2009 (Year: 2009).*

(Continued)

*Primary Examiner* — Jahangir Kabir
(74) *Attorney, Agent, or Firm* — Kilpatrick Townsend & Stockton LLP (57) ABSTRACT

Methods and systems for transmitting content during a networked conference. In an embodiment, a method is provided for secure access to online events. The method includes receiving a request from a user to access an online event, obtaining a user email address, an event identifier and an event passcode, and hashing the user email address, the event identifier and the event passcode to generate a ticket hash value. The method also includes forming a secure ticket that comprises the ticket hash value, and transmitting the secure ticket to the user. The method also includes receiving the secure ticket from the user when the user want to access the event, hashing the user email address, the event identifier, and the event passcode to generate a confirming hash value, and comparing the two hash values and granting event access to the user if the two hash values match.

20 Claims, 6 Drawing Sheets

(56) References Cited

U.S. PATENT DOCUMENTS

2016/0260031 A1 9/2016 Pace et al.
2021/0218545 A1* 7/2021 Kutti .................... H04L 9/0643

OTHER PUBLICATIONS

EP. Application No. EP21202240.4, Extended European Search Report, dated Feb. 22, 2022, 7 pages.

* cited by examiner

METHOD FOR A USER TO OBTAIN A SECURE TICKET TO AN EVENT

FIG. 6

METHOD FOR OPERATING AN STA TO PROVIDE SECURE TICKETS

FIG. 7    METHOD FOR OPERATING AN STA TO GIFT A SECURE TICKET

METHODS AND APPARATUS FOR SECURE ACCESS TO ONLINE EVENTS

FIELD

The exemplary embodiments of the present invention relate to the field of network communication. More specifically, the exemplary embodiments of the present invention relate to providing secure access to online events.

BACKGROUND

With the increasing popularity of digital electronics and network communications, networked events have become more popular. For example, training, music performances, sporting events, and conferences are only few types of network events that are available for network users to attend.

Typically, to attend an online event, users register and receive electronic tickets online. However, it is possible that a user obtains an electronic ticket and then shares this ticket with other users to avoid paying event fees. For example, a first user can purchase a ticket to an event and then copy the purchased ticket for distribution to other users. Then, all the users present the same ticket to gain access to the event, which results in loss of ticket fees and poor event security.

Therefore, it is desirable to have a system that provides access to online events that prevent loss of ticket fees and provide improved security.

SUMMARY

In various embodiments, methods apparatus for secure access to online events are provided. For example, in an embodiment, a secure ticket system is provided that users log into to obtain access to online events. The secure ticket system provides a list of available events to registered user. Each user makes a selection of an event to access. The selection may include making a payment and providing all necessary information to attend the event. The secure ticket system receives event selections from a plurality of online users, and for each user, generates a secure ticket to the selected event. The secure ticket is provided in the form of a URL that includes a ticket hash value. The ticket hash value is generated from event information and the particular user's email address. When a user is ready to attend an event, the user clicks on the URL to provide the ticket hash to the secure ticket system. The system then utilizes the event and user email address to generate a confirming hash value that is compared to the presented ticket hash value. If the two hash values match the user is granted access to the event. If the two hash values do not match, the user is denied event access. Thus, the secure ticket system prevents ticket copying since the tickets are encoded so that only a specific registered user will be able to use the ticket to access the event. In another embodiment, the user can give a secure ticket to an event as a gift to a giftee. For example, when purchasing the ticket, the user provides the email address of the giftee. The secure ticket is sent to the giftee's email address. When the time for the event arrives, the giftee logs into the system and provides the giftee's email address. The system operates as before to generate a confirming hash using the giftee email address to validate the ticket provided by the giftee.

In an embodiment, a method is provided for secure access to online events. The method includes receiving a request from a user to access an online event, obtaining a user email address, an event identifier and an event passcode, and hashing the user email address, the event identifier and the event passcode to generate a hash output. The method also includes forming a secure ticket that comprises the hash output, and transmitting the secure ticket to the user. The method also includes receiving a second secure ticket from the user when the user want to access the event, hashing the user email address, the event identifier and the event passcode to generate a second hash output, and comparing the first and second hash outputs to determine if user ticket is authenticated.

In an embodiment, apparatus is provided for secure access to online events. The apparatus comprises a transceiver that receives a request from a user to access an online event, a user database that stores a user email address, and an event directory the stores an event identifier and an event passcode. The apparatus also comprises a hash circuit that hashes the user email address, the event identifier and the event passcode to generate a ticket hash value, and a processor that forms a secure ticket that comprises the ticket hash value, and transmits the secure ticket to the user.

In an embodiment, a non-transitory computer readable medium is provided on which are stored program instructions that, when executed by one or more processors, cause the one or more processors to perform operations of: operations of: receiving a request from a user to access an online event; obtaining a user email address, an event identifier and an event passcode; hashing the user email address, the event identifier and the event passcode to generate a ticket hash value; forming a secure ticket that comprises the ticket hash value; and transmitting the secure ticket to the user.

Additional features and benefits of the exemplary embodiments of the present invention will become apparent from the detailed description, figures and claims set forth below.

BRIEF DESCRIPTION OF THE DRAWINGS

The exemplary embodiments of the present invention will be understood more fully from the detailed description given below and from the accompanying drawings of various embodiments of the invention, which, however, should not be taken to limit the invention to the specific embodiments, but are for explanation and understanding only.

DETAILED DESCRIPTION

Embodiments of the present invention disclose systems, methods, and apparatus for providing secure access to online events.

The purpose of the following detailed description is to provide an understanding of one or more embodiments of the present invention. Those of ordinary skills in the art will realize that the following detailed description is illustrative only and is not intended to be in any way limiting. Other embodiments will readily suggest themselves to such skilled persons having the benefit of this disclosure and/or description.

In the interest of clarity, not all of the routine features of the implementations described herein are shown and described. It will, of course, be understood that in the development of any such actual implementation, numerous implementation-specific decisions may be made in order to achieve the developer's specific goals, such as compliance with application and business related constraints, and that these specific goals will vary from one implementation to another and from one developer to another. Moreover, it will be understood that such a development effort might be complex and time-consuming but would nevertheless be a routine undertaking of engineering for those of ordinary skills in the art having the benefit of embodiments of this disclosure.

Various embodiments of the present invention illustrated in the drawings may not be drawn to scale. Rather, the dimensions of the various features may be expanded or reduced for clarity. In addition, some of the drawings may be simplified for clarity. Thus, the drawings may not depict all of the components of a given apparatus (e.g., device) or method. The same reference indicators will be used throughout the drawings and the following detailed description to refer to the same or like parts.

In accordance with the embodiments of present invention, the components, process steps, and/or data structures described herein may be implemented using various types of operating systems, computing platforms, computer programs, and/or general-purpose machines. In addition, those of ordinary skills in the art will recognize that devices of a less general-purpose nature, such as hardware devices, field programmable gate arrays (FPGAs), application specific integrated circuits (ASICs), or the like, may also be used without departing from the scope and spirit of the inventive concepts disclosed herein. Where a method comprising a series of process steps is implemented by a computer or a machine and those process steps can be stored as a series of instructions readable by the machine or computer for execution. The instructions may be stored on a tangible medium such as a computer memory device, such as, but not limited to, magnetoresistive random access memory ("MRAM"), phase-change memory, or ferroelectric RAM ("FeRAM"), flash memory, ROM (Read Only Memory), PROM (Programmable Read Only Memory), EEPROM (Electrically Erasable Programmable Read Only Memory), Jump Drive, magnetic storage medium (e.g., tape, magnetic disk drive, and the like), optical storage medium (e.g., CD-ROM, DVD-ROM, paper card and paper tape, and the like) and other known types of program memory.

The term "system" or "device" is used generically herein to describe any number of components, elements, sub-systems, devices, packet switch elements, packet switches, access switches, routers, networks, computer and/or communication devices or mechanisms, or combinations of components thereof. The term "computer" includes a processor, memory, and buses capable of executing instruction wherein the computer refers to one or a cluster of computers, personal computers, workstations, mainframes, or combinations of computers thereof.

Figure 1:
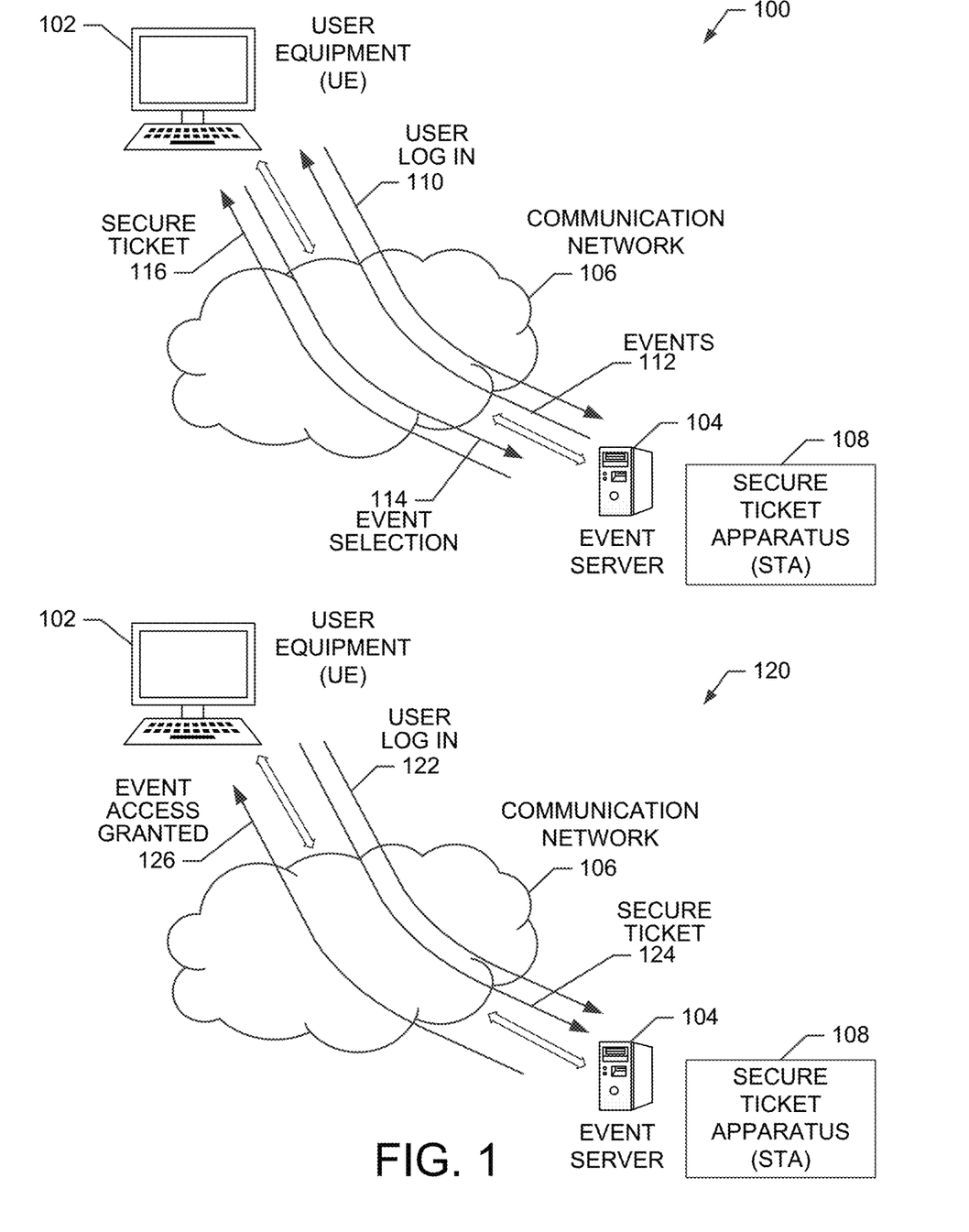
FIG. 1 shows a diagram illustrating a communication network in which secure access to online events are provided in accordance with various exemplary embodiments.

FIG. 1 shows diagrams illustrating a communication architecture that includes an embodiment of a secure ticket system. The secure ticket system provides a secure ticket apparatus (STA) that provides secure access to online events in accordance with various exemplary embodiments. The communication architecture 100 comprises user equipment (UE) 102 and event server 104 that are configured to communicate utilizing a communication network 106. In an embodiment, the communication network 106 comprises a wired communication network, a wireless communication network, or a combination of wired and wireless communication networks. The event server 104 is configured to communicate over the network 106 with a plurality of user devices of various types using any type of network protocol to provide secure access to online events in accordance with various exemplary embodiments.

The event server 104 comprises an embodiment of a secure ticket apparatus 108. During operation, a user operating user equipment 102 desire to obtain access to one or more events available from the event server 104. The user begins by logging into the STA 108 as indicated at 110. The STA 108 maintains a database of users and associated information, such as user email addresses. After the user logs in, the STA 108 provides a list of available events to the user equipment 102, as indicated at 112. The events comprise any type of online event, such as performances, training events, sporting events, conferences, or any other suitable online event.

After reviewing the available events, the user sends an event selection, as indicated at 114, which identifies an event the user would like to attend. For example, the selection identifies the event and includes payment and any other information necessary to obtain the right to access the event. In respond to receiving the event selection, the STA 108 hashes user information and event information to generate a ticket hash value for that user. Since the ticket hash is formed with user information, the ticket hash is associated with that particular user. The STA 108 then generates a uniform resource locator (URL) that includes the ticket hash and sends that URL as a secure ticket to the user, as indicated at 116. The user can then utilize that secure ticket at a later time to attend the selected event. During operation, the STA 108 operates to generate secure tickets for any number of users to attend any number of available events.

The communication architecture 120 illustrates how a user utilizes the secure ticket 116 at a later time to attend an event. For example, the user may store the secure ticket 116 at the user equipment 102 until the event occurs, which may be hours, days, weeks, or months after the secure ticket is obtained. The user first logs into the STA 108, as indicated at 122. The user then provides the secure ticket, as indicated at 124. For example, the user clicks on the provided URL, which accesses a particular location/resource at the STA 108 and provides the ticket hash.

The STA 108 then hashes user information and event information to generate a confirming hash value for that user. The STA 108 that compares the ticket hash to the confirming hash to determine if they match. If they match, the user is granted access to the event, as indicated at 126. If they don't match, the user's request to attend the event is denied. Thus, the secure ticket is associated with the login information (e.g., email address) of the user that receives the secure ticket. When that user logs in again to use the ticket, the STA 108 confirms that it is the same user having the same login information and then authenticates the ticket. If a second user logs in and presents the original user's ticket, access to the event will be denied since the ticket hash will not match the confirming hash for that second user. More detailed descriptions of the various implementations and operations of the secure ticket apparatus 108 are provided below.

Figure 2:
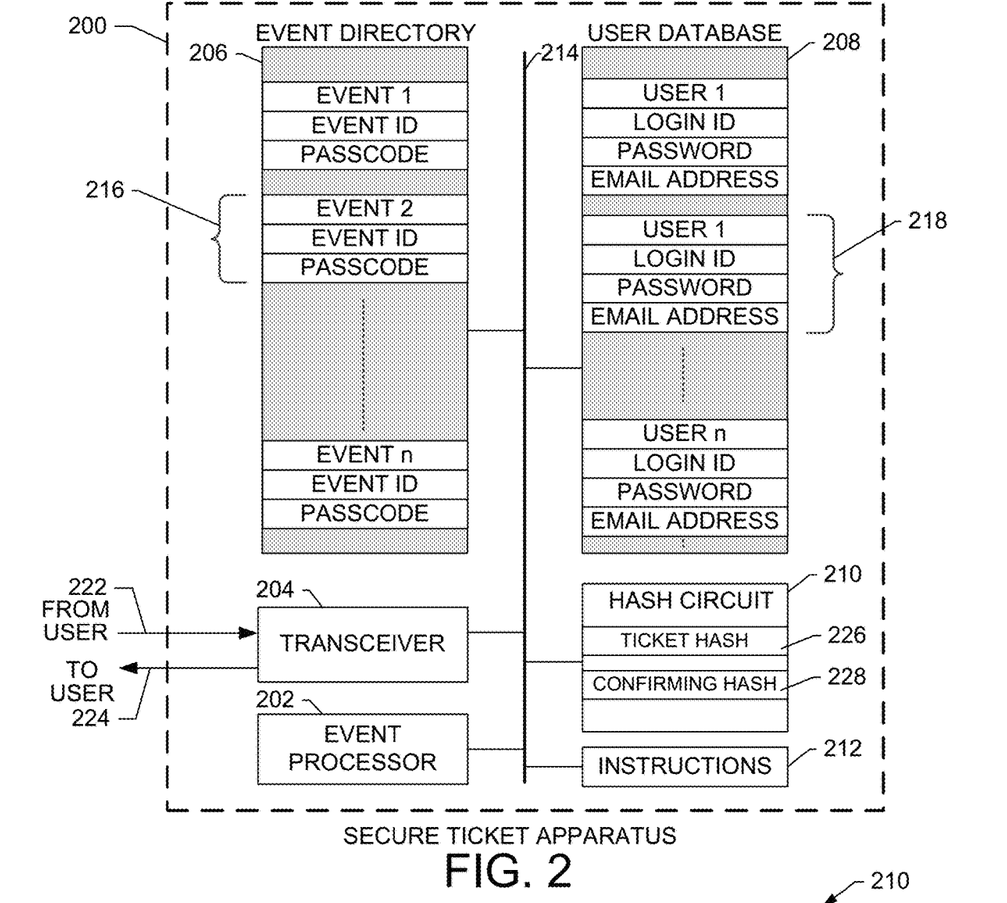
FIG. 2 shows an exemplary detailed embodiment of a secure ticket apparatus that operates to provide secure access to online events in accordance with various exemplary embodiments.

FIG. 2 shows an exemplary detailed embodiment of an STA 200 that operates to provide secure access to online events in accordance with various exemplary embodiments. For example the STA 200 is suitable for use as the STA 108 shown in FIG. 1. The STA 200 comprises event processor 202, memory 212 comprising instructions for execution by the processor 202, transceiver 204, event directory 206, user database 208, and hash circuit 210 all connected to communicate over bus 214.

During operation, the transceiver 204 communicates with users over the network 106. For example, the transceiver 204 receives communications from users as indicated at 222 and transmits information to users as indicated at 224. The event directory 206 includes a plurality of events that are available and offered to users. For example, the event directory 206 includes events such as event 216, which comprises an event name, an event identifier (ID), and an event passcode. The user database 208 comprises information about a plurality of registered users. For example, the user database 208 includes user names, login identifiers, passwords, and email addresses associated with the registered users, has indicated at 218.

When a user wishes to obtain access to an event, the user logs into the STA through the transceiver 204. After logging in, the event processor 202 transmits a list of available events from the event directory 206 to the user as indicated at 224. After selecting an event to attend, the user transmits the event selection to the STA, which is received by the event processor 202. The event processor 202 obtains the event identifier and passcode of the event selected by the user from the event directory 206. The event processor 202 also obtains the email address of the user that is stored in the user database 208.

The event processor 202 passes the event ID, the event passcode, and the user email address to the hash circuit 210. The hash circuit 210 operates to perform a hashing function to generate a ticket hash 226. The ticket hash 226 is passed back to the processor 202, which generates a secure ticket in the form of a URL that includes the ticket hash. The secure ticket is transmitted back to the user as indicated at 224.

At some time in the future, the user wishes to attend the event. The user logs into the STA and then transmits the secure ticket. For example, the user clicks on the provided URL, which transmits the ticket hash back and event information back to the STA. In one embodiment, the event processor 202 obtains the event identifier and event passcode from the event directory 206 and passes this information to the hash circuit 210. The event processor also obtains the user's email address from the user database and passes this information to the hash circuit 210. The hash circuit performs a hashing function with this information to generate a confirming hash 228, which is passed back to the event processor 202.

The event processor 202 compares the ticket hash value received from the user with the newly generated confirming hash value 228. If the two hash values match, the event processor 202 authenticate the user and provides the user access to attend the event. If the two hash values do not match, the users request to attend the event is denied.

In various exemplary embodiments, the STA 200 performs at least the following operations to provide secure access to online events.

1. Maintains an event directory of online event information including event identifiers and associated passcodes.
2. Maintains a database of user information including user email addresses.
3. Receives requests from users to obtain access to online events.
4. Responds to each user access request by hashing event information with each user's email address to generate a ticket hash.
5. Generates a secure ticket in the form of a URL that includes the ticket hash.
6. Transmit the secure ticket to that user. (operations 3-6 are performed for each user)
7. Receives secure tickets from users requesting to attend online events.
8. Respond to each user's secure ticket by hashing event information with that user's email address to generate a confirming hash.
8. Compares the ticket hash with the confirming hash.
9. When the hash values match, that user is authenticated and allowed to attend the event. If the hash values don't match, that user's request for event access is denied. (operations 7-9 are performed for each user)

Figure 3:
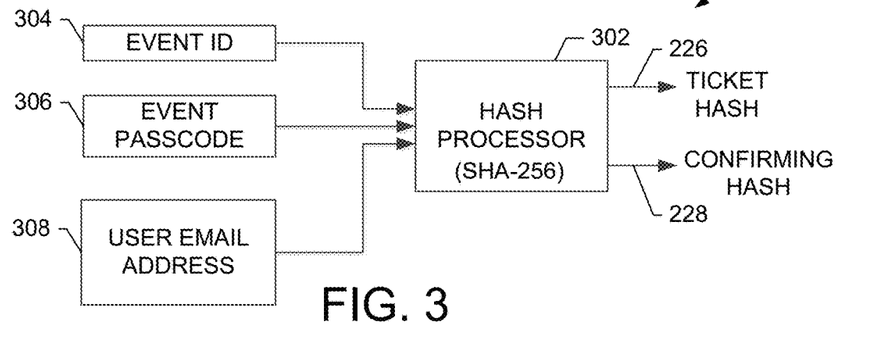
FIG. 3 shows an exemplary detailed embodiment of a hash circuit for use with the STA shown in FIG. 2.

FIG. 3 shows an exemplary detailed embodiment of the hash circuit 210 for use with the STA shown in FIG. 2. In an embodiment, the hash circuit 210 comprises a hash processor 302. During operation, the hash processor 302 receives three pieces of information. The hash processor 302 receives an event identifier 304, an event pass code 306, and a user email address 308. In an embodiment the hash processor 302 performs a hashing function on the three pieces of information, such as a SHA-256 hashing function, to generate a hash value. To generate a secure ticket the hash processor 302 generates the ticket hash 226. To confirm the authenticity of the ticket hash, the hash processor 302 also generates the confirming hash 228. It should be noted that other types of hashing processes can be performed by the hash processor 302 and that the hash processor 302 is not limited to using only SHA-256 hashing.

Figure 4A:
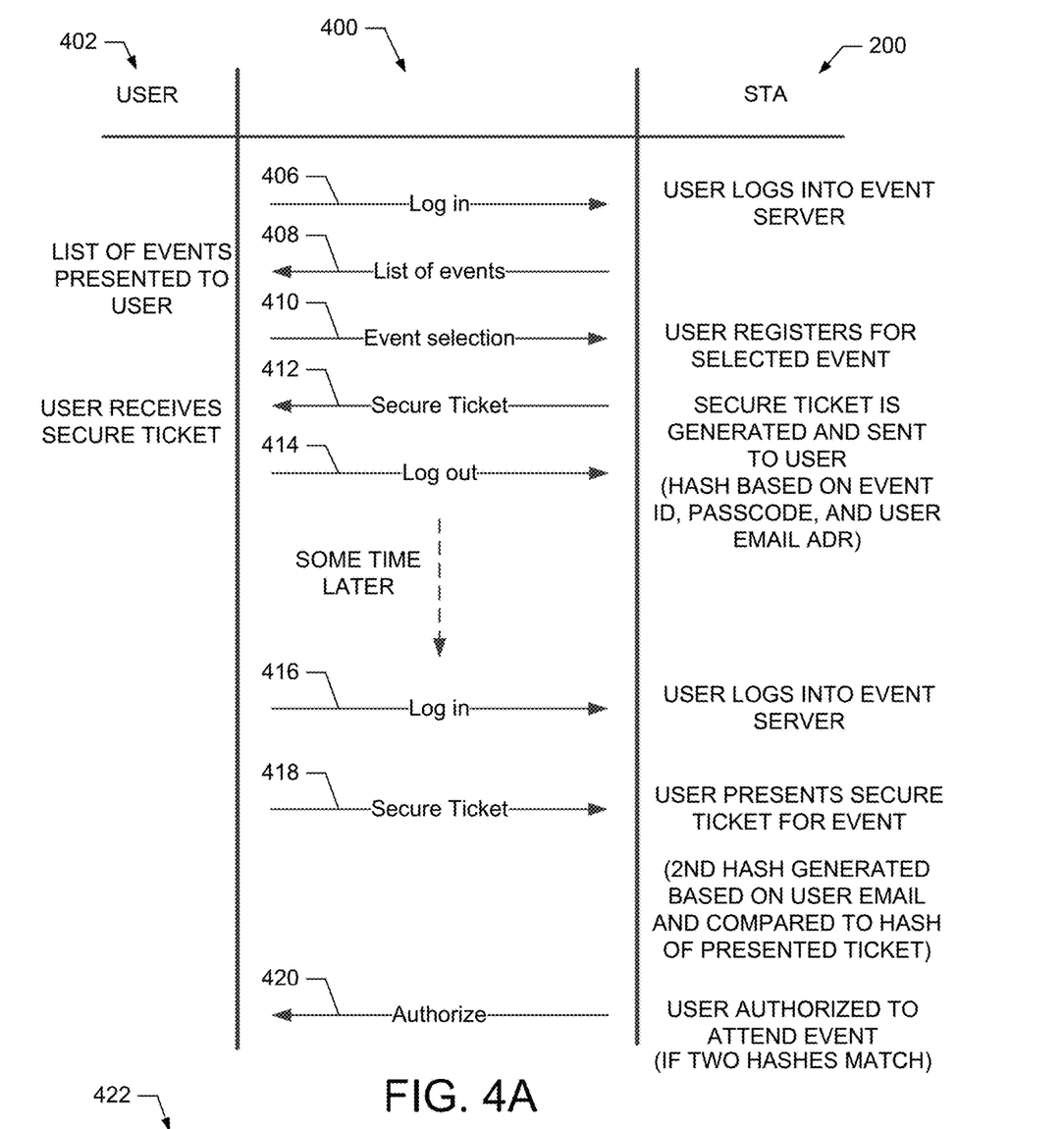
FIG. 4A shows an exemplary signal flow diagram that illustrates the operation of an STA to provide secure access to online events in accordance with various exemplary embodiments.

FIG. 4A shows an exemplary signal flow diagram 400 that illustrates the operation of the STA 200 to provide secure access to online events in accordance with various exemplary embodiments. The signal flow diagram 400 illustrates signaling between a user 402 and the STA 200. Initially the user logs into the STA as indicated at 406. In response to the user login, the STA provides a list of events 408 from the event directory 206. After reviewing the list of events, the user makes an event selection and transmits this event selection to the STA as indicated at 410. The STA receives the event selection and generates a ticket hash based on event information and the user's email address. For example, the hashing circuit 210 performs a SHA-256 hashing function on the event ID, event passcode, and the user email address to generate the ticket hash 226. The event processor 202 receives the ticket hash and generates a URL that includes the ticket hash. The URL is transmitted back to the user as a secure ticket, as indicated by 412. The user then logs out from the STA as indicated at 414.

At a later time, the user wishes to attend the event. The user performs a login operation as indicated at 416. After logging in the user presents the secure ticket. For example the user clicks on the provided URL, which provides the ticket hash to the STA. The event processor 202 controls the hash circuit 210 to generate a confirming hash from the user's email address and the event information. The processor 202 then compares the ticket hash with the confirming hash, and if the two hash values match, the user is authenticated and allowed to attend the event, as indicated at 420. If the two hash values do not match, the request to attend the event from the user is denied. Thus, only the registered user that received the secure ticket can use that ticket. This prevents users who have a ticket from copying that ticket and passes it to other unauthorized users.

Figure 4B:
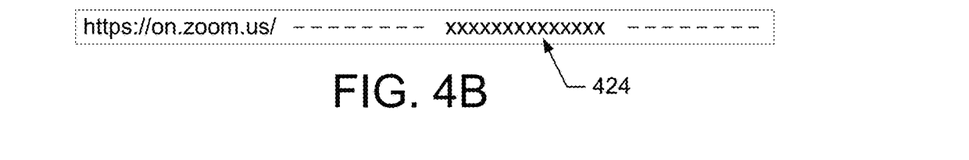
FIG. 4B shows an exemplary universal resource locator (URL) generated during operation of the STA to provide secure access to online events in accordance with various exemplary embodiments

FIG. 4B shows an exemplary uniform resource locator (URL) 422 generated during operation of the STA 200 to provide secure access to online events in accordance with various exemplary embodiments. For example, the URL 422 is generated to include a hash 424 to form a secure ticket. For example, the URL 422 may be the secure ticket 412 transmitted to the user from the STA. The URL 422 is exemplary and the inclusion of the hash 424 is not limited to any particular format or structure.

Figure 5:
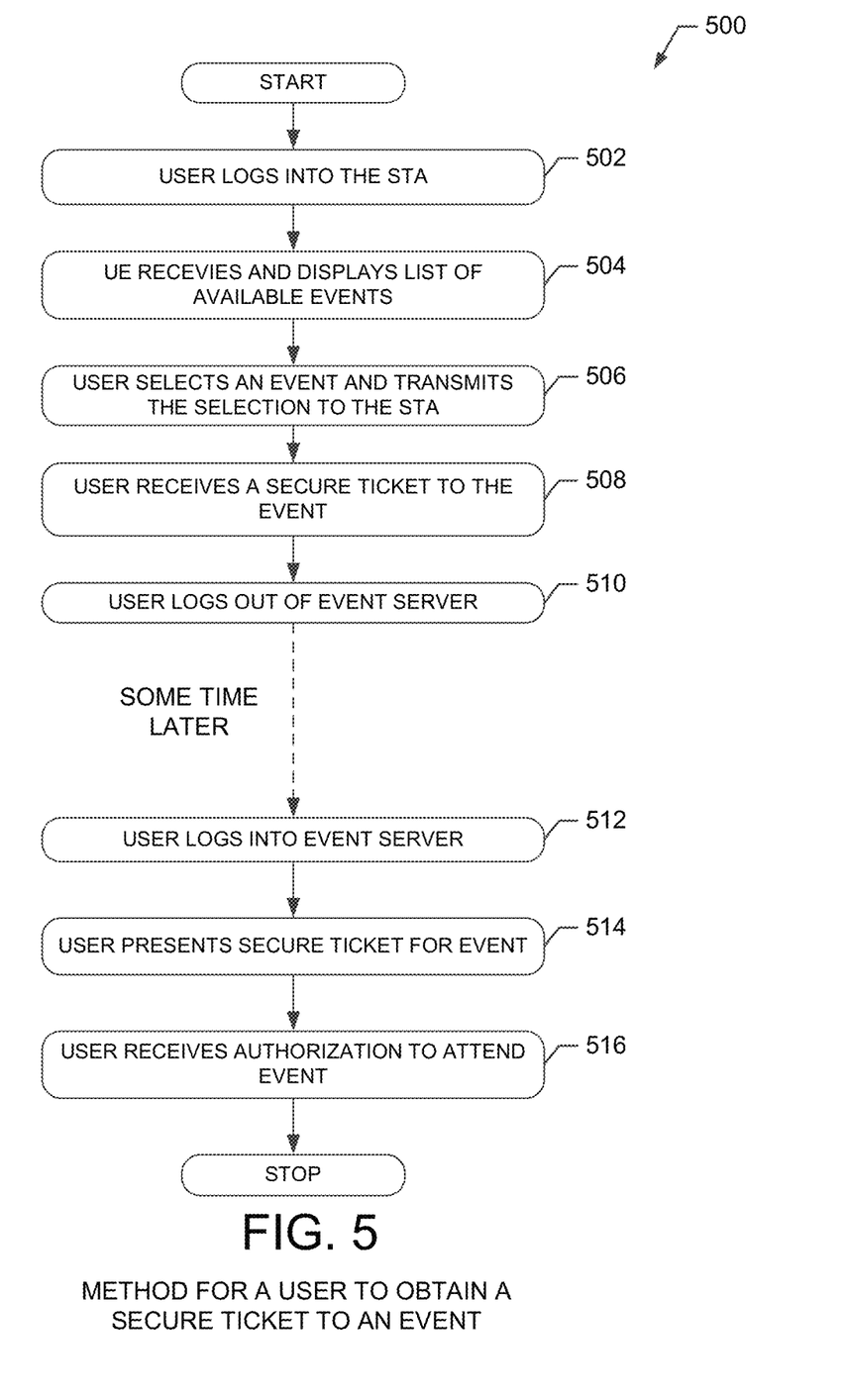
FIG. 5 shows an exemplary method for operating user equipment to access a secure ticket apparatus to obtain secure access to online events in accordance with various exemplary embodiments.

FIG. 5 shows an exemplary method 500 for operating user equipment to access an STA to obtain secure access to online events in accordance with various exemplary embodiments. For example, in an embodiment, the method 500 is performed by the user equipment 102 shown in FIG. 1.

At block 502, a user logs into the secure ticket apparatus. For example, as illustrated in the architecture 100 shown in FIG. 1, the user of UE 102 logs into the STA 108 using the network 106, as indicated at 110.

At block 504, the user receives a list of available events from the secure ticket apparatus. For example, the list of events 112 is sent to the UE 102, as shown in FIG. 1.

At block 506, the user selects an event to attend from the received list of events and transmits the selection to the STA, as shown at 114 in FIG. 1.

At block 508, the user receives a secure ticket to the event. For example, the secure ticket is in the form of a URL that includes a ticket hash that is based on the user's email address.

At block 510, the user logs out of the STA and stores the secure ticket that was received.

Sometime after logging out, which could be days or weeks, the user logs back into the STA in order to attend the event.

At block 512, the user logs into the STA. For example, as illustrated in the architecture 120 shown in FIG. 1, the user of UE 102 logs into the STA 108 using the network 106, as indicated at 122.

At block 514, the user presents the secure ticket for the event. For example the user clicks on the URL that was previously received and the ticket hash as part of the URL is presented to the STA, as indicated at 124 in FIG. 1. After receiving the secure ticket at the SDA, if the received ticket hash matches a confirming hash generated at the STA, the user is granted access to the event. If the ticket hash and the confirming hash do not match, the user is denied access to the event.

At block 516, the user is granted access to the event when the ticket hash value matches the confirming hash value, as indicated at 126.

Thus, the method 500 describes operations for use with user equipment to obtain secure access to online events. It should be noted that the operations of the method 500 are exemplary and not limiting of the scope of the embodiments. Furthermore the operations of the method 500 can be changed, deleted, rearranged, added to, or otherwise modified within the scope of the embodiments.

Figure 6:
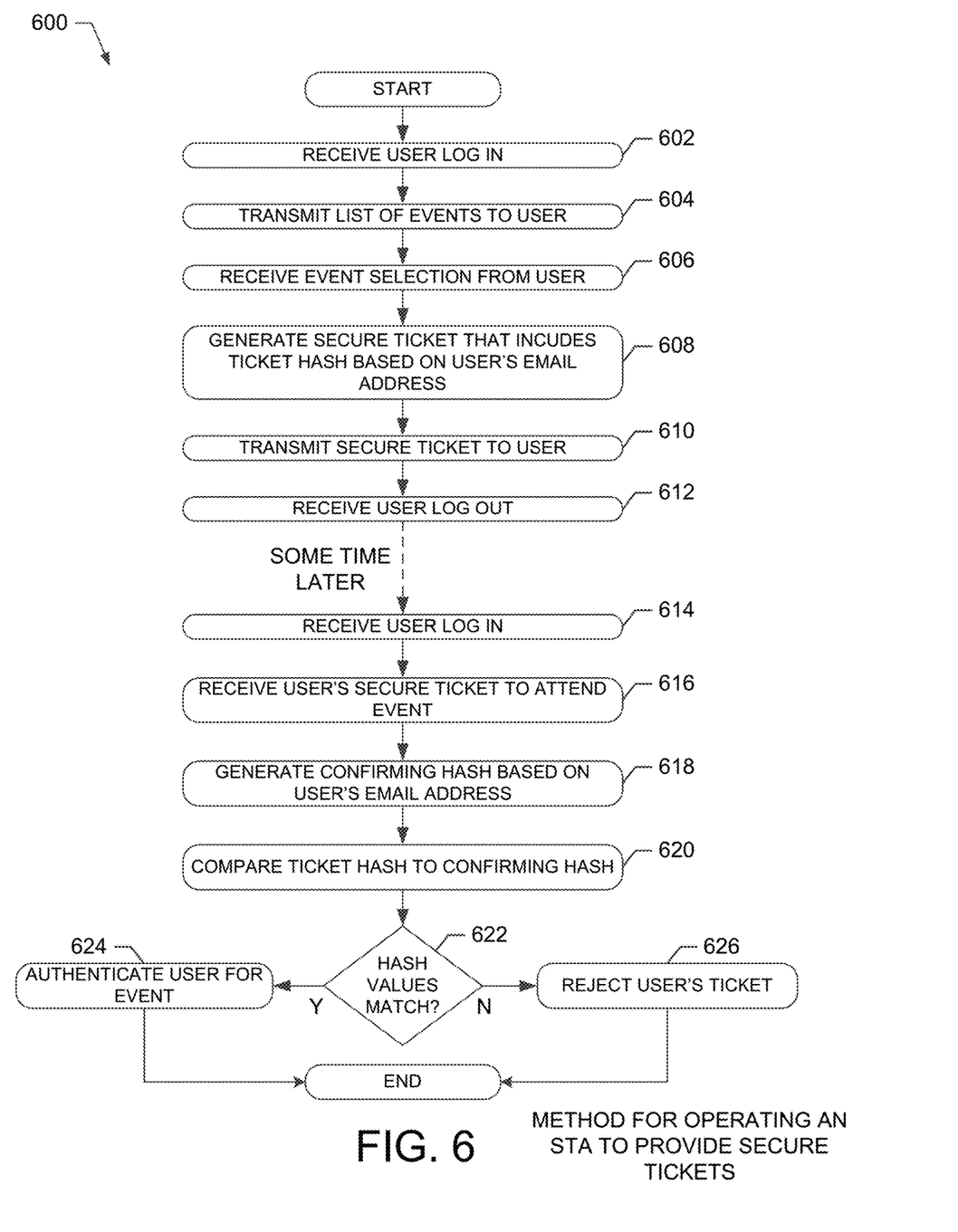
FIG. 6 shows an exemplary method for operating an STA to provide secure access to online events.

FIG. 6 shows an exemplary method 600 for operating an STA to provide secure access to online events. For example, the method 600 is suitable for use with the STA 200 shown in FIG. 2.

At block 602, a user logs into a secure ticket apparatus. For example, the user of user equipment 102 logs into the STA 108 shown at 110 in FIG. 1. The log in is received by the transceiver 204 of the STA 200 shown in FIG. 2.

At block 604, a list of available events is transmitted to the user. For example the event processor 202 obtains the list of available events from the event directory 206 and transmits this list to the user, as shown at 112 in FIG. 1.

At block 606, an event selection is received from the user. For example, the transceiver 204 receives the event selection from the user and passes this selection to the event processor 202.

At block 608, a secure ticket that includes a ticket hash based on the user's email address is generated. For example, in an exemplary embodiment, the processor 202 passes the event information and the user's email address to the hash circuit 210, which hashes the information together to form the ticket hash 226 that is passed back to the processor 202. The processor 202 generates a secure ticket in the form of a URL that includes the ticket hash.

At block 610, the secure ticket is transmitted to the user. For example, the processor 202 utilizes the transceiver 204 to transmit the secure ticket to the user.

At block 612, the user logs out of the STA.

At some time later, which may be hours, days, or weeks later, the following operations are performed by the STA.

At block 614, the user logs into the STA. For example, the user of user equipment 102 logs into the STA 108 shown at 122 in FIG. 1. The log in is received by the transceiver 204 of the STA 200 shown in FIG. 2.

At block 616, a secure ticket from the user is received. For example, the user clicks on the URL, which provides the ticket hash to the STA. For example, the processor 202 receives the ticket has from the logged in user.

At block 618, a confirming hash is generated based on the user's email address. For example, the processor 202 passes the event information and the user's email address to the hash circuit 210, which generates the confirming hash value 228 and passes this value back to the processor 202.

At block 620, a ticket hash is compared to the confirming hash. For example, the processor 202 compares the ticket hash value to the confirming hash value.

At block 622, a determination is made as to whether the ticket hash value matches the confirming hash value. For example, the processor 202 compares the two hash values. If the hash values match, the method proceeds to block 624. If the hash values do not match, the method proceeds to block 626.

At block 624, the hash values match so the user's ticket is authenticated and the user is granted access to the event as indicated at 118.

At block 626, the hash values do not match so the user's ticket is rejected and the user is denied access to the event.

Thus, the method 600 describes operations for use with an STA to provide secure access to online events. It should be noted that the operations of the method 600 are exemplary and not limiting of the scope of the embodiments. Furthermore the operations of the method 600 can be changed, deleted, rearranged, added to, or otherwise modified within the scope of the embodiments.

Figure 7:
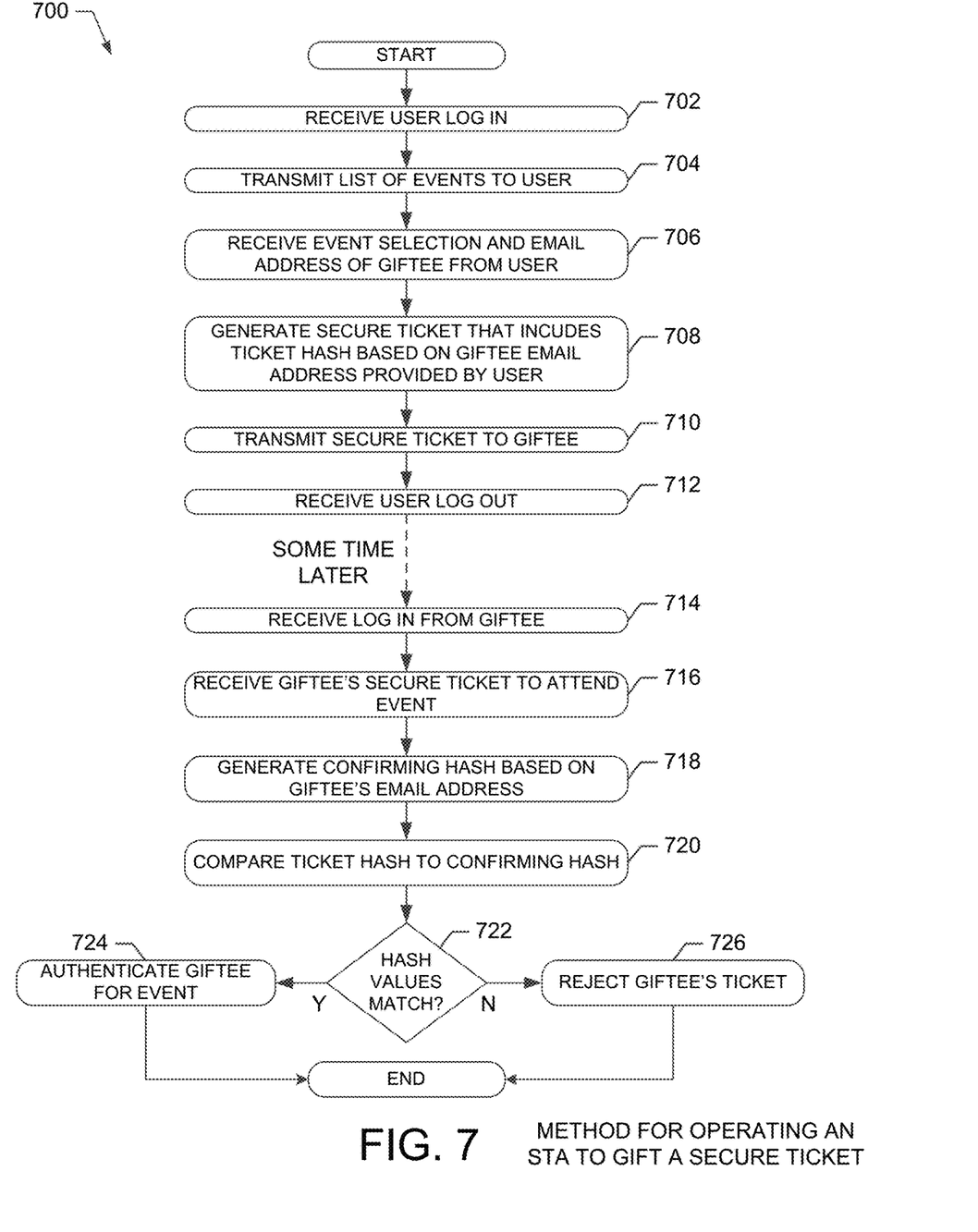
FIG. 7 shows an exemplary method for operating an STA to provide a gift of secure access to online events.

FIG. 7 shows an exemplary method 700 for operating an STA to provide a gift of secure access to online events. For example, the method 700 is suitable for use with the STA 200 shown in FIG. 2.

At block 702, a user logs into a secure ticket apparatus. For example, the user of user equipment 102 logs into the STA 108 shown at 110 in FIG. 1. The log in is received by the transceiver 204 of the STA 200 shown in FIG. 2.

At block 704, a list of available events is transmitted to the user. For example the event processor 202 obtains the list of available events from the event directory 207 and transmits this list to the user, as shown at 112 in FIG. 1.

At block 706, an event selection and an email address of a giftee is received from the user. For example, the user wishes to give a gift of the event to another user (giftee) that is registered in the user database 208. The user provide the email address of the giftee along with the event selection. For example, the transceiver 204 receives the event selection and giftee email address from the user and passes this selection to the event processor 202.

At block 708, a secure ticket that includes a ticket hash based on the giftee's email address is generated. For example, in an exemplary embodiment, the processor 202 passes the event information and the giftee's email address to the hash circuit 210, which hashes the information together to form the ticket hash 227 that is passed back to the processor 202. The processor 202 generates a secure ticket in the form of a URL that includes the ticket hash.

At block 710, the secure ticket is transmitted to the giftee. For example, the processor 202 utilizes the transceiver 204 to transmit the secure ticket to the email address of the giftee.

At block 712, the user logs out of the STA.

At some time later, which may be hours, days, or weeks later, the following operations are performed by the STA.

At block 714, the giftee logs into the STA. For example, the giftee logs in using equipment owned and operated by the giftee. The log in is received by the transceiver 204 of the STA 200 shown in FIG. 2.

At block 716, a secure ticket from the giftee is received. For example, the giftee clicks on the URL that was previously received by the giftee, which provides the ticket hash to the STA. For example, the processor 202 receives the ticket has from the logged in user.

At block 718, a confirming hash is generated based on the giftee's email address. For example, the processor 202 passes the event information and the giftee's email address to the hash circuit 210, which generates the confirming hash value 228 and passes this value back to the processor 202.

At block 720, a ticket hash is compared to the confirming hash. For example, the processor 202 compares the ticket hash value to the confirming hash value.

At block 722, a determination is made as to whether the ticket hash value matches the confirming hash value. For example, the processor 202 compares the two hash values. If the hash values match, the method proceeds to block 724. If the hash values do not match, the method proceeds to block 726.

At block 724, the hash values match so the giftee's ticket is authenticated and the giftee is granted access to the event as indicated at 118.

At block 726, the hash values do not match so the giftee's ticket is rejected and the giftee is denied access to the event.

Thus, the method 700 describes operations for use with an STA to provide a gift of secure access to online events. It should be noted that the operations of the method 700 are exemplary and not limiting of the scope of the embodiments. Furthermore the operations of the method 700 can be changed, deleted, rearranged, added to, or otherwise modified within the scope of the embodiments.

In an embodiment, the exemplary embodiments described herein are implemented using customized hard-wired logic, one or more ASICs or FPGAs, firmware and/or program logic which in combination with a computer system causes or programs the disclosed apparatus to be a special-purpose machine. According to one embodiment, the operations described herein are performed by a processor or computer executing one or more sequences of one or more instructions contained in memory. Such instructions may be read into memory from another storage medium. Execution of the sequences of instructions contained in memory causes a processor to perform the process steps described herein. In alternative embodiments, hard-wired circuitry may be used in place of or in combination with software instructions.

The term "storage media" as used herein refers to any non-transitory medium that stores data and/or instructions that cause a machine to operate in a specific fashion. Such storage media may comprise non-volatile media and/or volatile media. Non-volatile media includes, for example, optical or magnetic disks, such as memory 404 or instructions memory 412. Volatile media includes dynamic memory. Common forms of storage media include, for example, a floppy disk, a flexible disk, a hard disk, a solid state drive, a magnetic tape, or any other magnetic data storage medium, a CD-ROM, any other optical data storage medium, any physical medium with patterns of holes, a RAM, a PROM, and an EPROM, a FLASH-EPROM, an NVRAM, any other memory chip or cartridge.

Storage media is distinct from but may be used in conjunction with transmission media. Transmission media participates in transferring information between storage media. For example, transmission media includes coaxial cables, copper wire, and fiber optics. Transmission media can also take the form of acoustic or light waves, such as those generated during radio-wave and infra-red data communications.

Various forms of media may be involved in carrying one or more sequences of one or more instructions to a disclosed processor for execution. For example, the instructions may initially be carried on a magnetic disk or a solid-state drive of a remote computer. The remote computer can load the instructions into its dynamic memory and send the instructions over a telephone line using a modem. A local modem can receive the data on the telephone line and use an infra-red transmitter to convert the data to an infra-red signal. An infra-red detector can receive the data carried in the infra-red signal and appropriate circuitry can place the data on a data bus, for instance bus 214, which carries the data to memory 212, from which processor 202 retrieves and executes the instructions. The instructions may optionally be stored on a storage device either before or after execution by processor 202.

The exemplary embodiment of the present invention includes various processing steps described herein. The steps of the embodiment may be embodied in machine or computer executable instructions. The instructions can be used to cause a general purpose or special purpose system, which is programmed with the instructions, to perform the steps of the exemplary embodiment of the present invention. Alternatively, the steps of the exemplary embodiment of the present invention may be performed by specific hardware components that contain hard-wired logic for performing the steps, or by any combination of programmed computer components and custom hardware components.

While particular embodiments of the present invention have been shown and described, it will be obvious to those of ordinary skills in the art that based upon the teachings herein, changes and modifications may be made without departing from this exemplary embodiments of the present invention and its broader aspects. Therefore, the appended claims are intended to encompass within their scope all such changes and modifications as are within the true spirit and scope of this exemplary embodiments of the present invention.

What is claimed is:

1. A method for providing secure access to online events, the method comprising:
   receiving a request from a user to access an online event;
   obtaining a user email address, an event identifier and an event passcode;
   hashing the user email address, the event identifier and the event passcode using a hash circuit to generate a ticket hash value;
   forming a secure ticket as a secure uniform resource locator (URL) wherein the secure URL comprises the ticket hash value; and
   transmitting the secure ticket to the user.

2. The method of claim 1, further comprising transmitting a list of available events to the user.

3. The method of claim 1, wherein the operation of receiving comprises receiving the request from the user over a network connection.

4. The method of claim 1, wherein the operation of obtaining comprises obtain the user email from user registration information.

5. The method of claim 1, wherein the operation of obtaining comprises obtain the event identifier and the event passcode from an event database.

6. The method of claim 1, wherein the operation of hashing comprises hashing the email address, the event identifier, and the event passcode using a SHA-256 hashing operation to generate the ticket hash value.

7. The method of claim 1, further comprising causing the secure ticket to be stored on a user equipment.

8. The method of claim 1, further comprising receiving the secure ticket from the user when the user wants to access the event.

9. The method of claim 8, further comprising:
   hashing the user email address, the event identifier and the event passcode to generate a confirming hash value; and
   comparing the ticket hash value with the confirming hash value to determine if the user will be granted access to the event.

10. An apparatus for providing secure access to online events, the apparatus comprising:
    a transceiver that receives a request from a user to access an online event;
    a user database that stores a user email address;
    an event directory the stores an event identifier and an event passcode;
    a hash circuit that hashes the user email address, the event identifier and the event passcode to generate a ticket hash value; and
    a processor that forms a secure ticket as a secure uniform resource locator (URL) wherein the secure URL comprises the ticket hash value, and transmits the secure ticket to the user.

11. The apparatus of claim 10, wherein the processor transmits a list of available events to the user.

12. The apparatus of claim 10, wherein the transceiver receives the request from the user over a network connection.

13. The apparatus of claim 10, wherein the hash circuit hashes the email address, the event identifier, and the event passcode using a SHA-256 hashing operation to generate the ticket hash value.

14. The apparatus of claim 10, wherein the transceiver receives the secure ticket from the user requesting access the event.

15. The apparatus of claim 14, wherein the hash circuit hashes the user's email address, the event identifier and the event passcode to generate a confirming hash value.

16. The apparatus of claim 15, wherein the processor compares the ticket hash value and the confirming hash value to determine if the user is granted access to the event.

17. A non-transitory computer readable medium on which are stored program instructions that, when executed by one or more processors, cause the one or more processors to perform operations of:
    receiving a request from a user to access an online event;
    obtaining a user email address, an event identifier and an event passcode;
    hashing the user email address, the event identifier and the event passcode using a hash circuit to generate a ticket hash value;
    forming a secure ticket as a secure uniform resource locator (URL) wherein the secure URL comprises the ticket hash value; and
    transmitting the secure ticket to the user.

18. The non-transitory computer readable medium of claim 17, wherein the program instructions cause the one or more processors to receive the secure ticket from the user when the user wants to access the event.

19. The non-transitory computer readable medium of claim 17, wherein the program instructions cause the one or more processors to:
    hash the user email address, the event identifier and the event passcode to generate a confirming hash value;
    compare the ticket hash value with the confirming hash value; and
    grant the user access to the event if the ticket hash value and the confirming hash value match.

20. The non-transitory computer readable medium of claim 17, wherein the program instructions further cause the one or more processors to cause the secure ticket to be stored on a user equipment.

* * * * *